Figure 1:
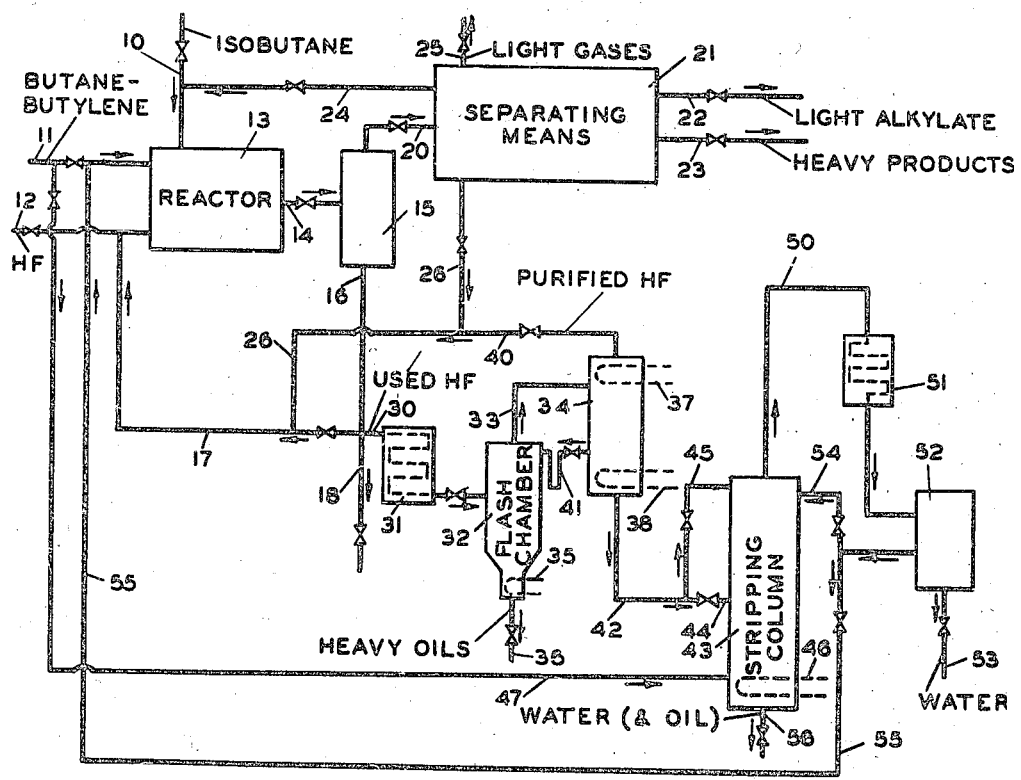

Patented Mar. 25, 1947

2,417,875

UNITED STATES PATENT OFFICE 2,417,875

REMOVAL OF HYDROGEN FLUORIDE FROM WATER

Ancel B. Leonard, Phillips, Tex., assignor to Phillips Petroleum Company, a corporation of Delaware Application June 17, 1944, Serial No. 540,757

9 Claims. (Cl. 260—683.4)

This invention relates to the removal of hydrogen fluoride from aqueous mixtures thereof. In one specific embodiment the invention relates to the removal of hydrogen fluoride from an aqueous mixture which is obtained in the purification of a partially spent hydrofluoric acid catalyst.

Hydrogen fluoride in the form of a liquid, commonly used as highly concentrated or substantially anhydrous hydrofluoric acid, has recently come into prominence as a very important catalyst for numerous organic reactions. For example, it is used alone, or in admixture with minor amounts of a boron halide such as boron fluoride, as a catalyst in the conversion of hydrocarbons by alkylation, isomerization, disproportionation, and the like. It is also used as a refining agent and/or a selective solvent to remove materials such as organic fluorine compounds, sulfur compounds, and other non-hydrocarbon organic impurities from liquid hydrocarbon materials such as effluents of a hydrocarbon-alkylation step, natural gasolines, lubricating oil fractions, and the like.

Perhaps the most important industrial process at the present time which involves the use of hydrofluoric acid as a catalyst is the alkylation of low-boiling paraffinic hydrocarbons, particularly isobutane and/or isopentane, with alkylating reactants, particularly low-boiling olefins such as propylene, various butylenes, and/or various amylenes to form normally liquid paraffins which generally have high octane numbers and are quite valuable as constituents of aviation fuels. In such alkylation processes the reactants are intimately contacted in liquid phase at temperatures between about 50 and about 150° F. with liquid concentrated hydrofluoric acid for reaction periods ranging from about 1 to about 30 minutes, and reaction effluents are passed to a settling zone wherein a liquid hydrocarbon phase and a liquid acid phase are separated. A large portion of the liquid hydrofluoric acid phase from this settling zone is generally recycled to the reaction zone while a portion thereof is generally withdrawn and subjected to purification for the removal of water and acid-soluble organic impurities. The hydrocarbon phase from the settling zone is generally subjected to fractional distillation to remove hydrogen fluoride dissolved therein, which is generally present to the extent of about 0.5 to about 3 per cent by volume, and to remove various hydrocarbon fractions which generally comprise unreacted isobutane, unreacted normal butane and one or more alkylate fractions. It is with the purification of the used liquid hydrofluoric acid that this invention has particular application.

In most of the plants operating in the general manner previously described, that portion of the used hydrofluoric acid which is subjected to purification is first flashed at an elevated temperature to remove high-boiling organic material which is generally designated as "acid soluble oils." If the temperature is sufficiently high, all of the hydrogen fluoride and water will be completely vaporized and at least a substantial proportion of the organic fluorine compounds present in the acid soluble oils will be decomposed forming free hydrogen fluoride which, of course, will pass off as vapors. The material removed as vapors is passed to a fractional distillation column, generally with at least partial cooling and condensation. From this distillation column is removed, as a low-boiling product, a fraction comprising substantially anhydrous hydrogen fluoride which can be returned to the conversion step. As a kettle product from this distillation an aqueous hydrogen fluoride is removed. The composition of this last fraction may be substantially that of a maximum-boiling azeotropic mixture, and at times the fraction may also include any hydrocarbon material such as alkylate which boils higher than hydrogen fluoride and lower than the acid soluble oils. The overhead fraction, which comprises substantially anhydrous hydrogen fluoride, may also contain a small amount of hydrocarbon material. In some instances it is desirable to remove from the kettle of this column a fraction containing substantially more hydrogen fluoride than the azeotropic aqueous mixture so that excessive corrosion will not be experienced. This fraction can then be distilled in a relatively small column made of a corrosion-resistant material, such as copper or silver, and the overhead product can be reintroduced into the overhead distillation column. As will be readily appreciated, the aqueous hydrogen fluoride fraction will, over a period of time in a continuous process, represent a loss of a considerable amount of hydrogen fluoride. I have now found that this hydrogen fluoride may be removed by subjecting this aqueous fraction to distillation in the presence of a low-boiling olefin hydrocarbon. Preferably an olefin having not more than six carbon atoms per molecule is used for this purpose, and more often a butylene or amylene, or various mixtures thereof, are used as hereinafter discussed. It appears that at least a substantial proportion of the hydrogen fluoride reacts with the olefin to form a corresponding alkyl fluoride. Alkyl fluorides have the peculiar property of boiling at a temperature not far removed from the boiling temperature of the olefin hydrocarbon or of the paraffin hydrocarbon to which they correspond. As a result, the alkyl fluoride so produced can be removed as a vapor from the distillation together with any unreacted olefin hydrocarbon and any accompanying paraffin hydrocarbon. The resulting alkyl fluorides do not act as a contaminant in the alkylation system, but on the contrary enter into the reaction as alkylating reactants, and as a modification of my process the fluoride-containing fraction recovered as a result of the treatment just discussed can be passed to the alkylation zone.

It is an object of this invention to remove hydrogen fluoride from an aqueous mixture thereof.

Another object of this invention is to remove hydrogen fluoride from an aqueous mixture which has been obtained in the purification of a used hydrofluoric acid catalyst.

A further object of this invention is to improve the operation of the purification steps applied to a hydrofluoric acid catalyst which has been used in the conversion of hydrocarbons.

Other objects and advantages of my invention will be apparent to one skilled in the art from the accompanying disclosure and description.

Figure 2:
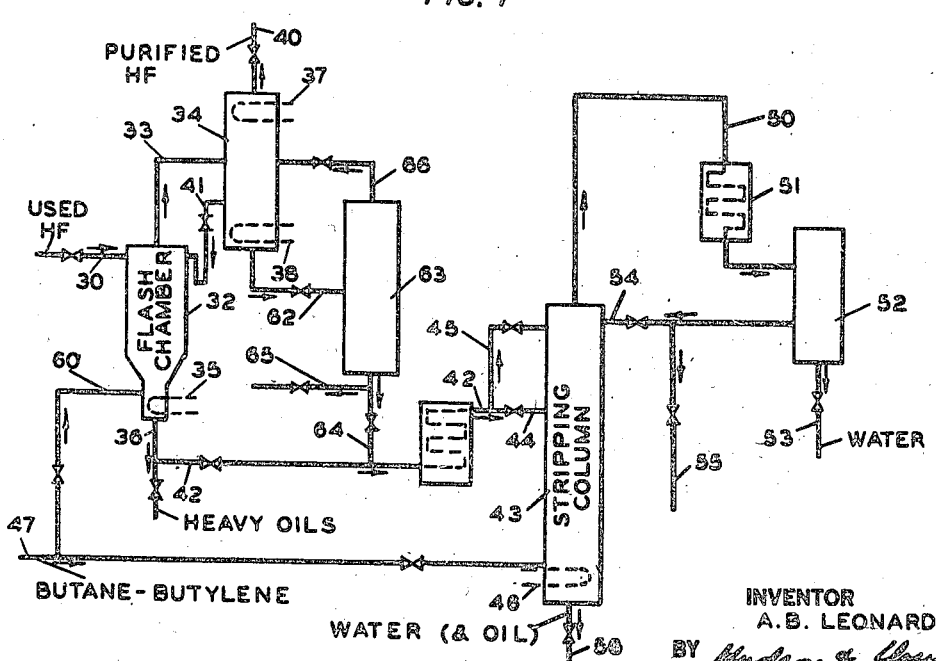

Although, as previously discussed, my invention can be applied with advantage in many modifications, particular benefits of it can be realized in connection with the alkylation of low-boiling isoparaffins and low-boiling olefins in the presence of a liquid hydrofluoric acid catalyst. It is believed that the principles of my invention may be adequately illustrated by the discussion of two specific modifications of such an embodiment in connection with the accompanying drawings which form a part of this application and which illustrate diagrammatically arrangements of apparatus suitable for practicing my invention in connection with such an alkylation process. In the drawing Figure 1 shows diagrammatically an arrangement of apparatus suitable for practicing the alkylation of isobutane with butylenes in the presence of a hydrogen fluoride catalyst, and includes a diagrammatic arrangement of apparatus for practicing the purification step in the manner briefly discussed hereinbefore. Figure 2 shows an alternative arrangement of apparatus for the purification step.

Referring now to Figure 1, a low-boiling isoparaffin such as isobutane is charged through pipe 10 and an olefin-containing fraction such as a butane-butylene fraction from a refinery, or a butylene-amylene fraction from a refinery is charged through pipe 11. Typical examples of such olefin-containing fractions are shown in the following table:

| Component | Liquid Volume, % | | | | | |
|---|---|---|---|---|---|---|
| | A | B | C | D | E | F |
| Propane and Lighter | 0.8 | | 0.2 | 0.5 | 0.6 | 0.7 |
| Isobutane | 9.6 | 8.1 | 7.9 | 35.1 | 30.7 | 33.0 |
| Butylenes | 16.6 | 24.9 | 20.0 | 17.0 | 17.3 | 16.3 |
| Normal Butane | 22.4 | 28.2 | 22.7 | 34.4 | 37.9 | 35.6 |
| Amylenes | 13.7 | 13.9 | 15.0 | 4.8 | 5.0 | 4.6 |
| Pentanes | 36.5 | 24.8 | 33.9 | 8.2 | 8.5 | 9.8 |
| Heavier | 0.4 | 0.1 | 0.3 | | | |
| | 100.0 | 100.0 | 100.0 | 100.0 | 100.0 | 100.0 |

A sufficient amount of isobutane is introduced, comprising fresh isobutane introduced through line 10 and recycled unreacted isobutane passing through line 24 so that the mol ratio of isobutane to olefins in the total feed to reactor 13 is between about 3:1 and 10:1, preferably about 5:1. When using an olefin-containing charge stock such as is shown in examples D, E and F in the preceding table, a separate charge of isobutane is generally unnecessary since such an olefin-containing feed contains an excess of isobutane of which a portion will remain unreacted and can be recycled to build up a desired excess of isobutane. Hydrofluoric acid catalyst is added through pipe 12 and the alkylation reaction takes place in reactor 13. A suitable amount of hydrofluoric acid catalyst is introduced so that together with recycled acid and purified acid a ratio of hydrocarbon to acid catalyst will be between about 1:1 and 10:1 on a liquid volume basis. The mixture of liquid hydrofluoric acid and liquid hydrocarbon is intimately admixed for a suitable reaction time, as previously discussed, and the resulting mixture is passed through pipe 14 to an acid settler 15 wherein a phase separation between a liquid hydrocarbon phase and a liquid hydrofluoric acid phase is readily obtained by settling. In case the conversion carried out in alkylation zone 13 is at a temperature higher than that which will permit ready separation of the effluents into two phases, suitable cooling means, not shown, may be provided in line 14 to bring the mixture within a preferred temperature range. Generally a temperature of about 80 to about 180° F., such as is obtained by ordinary cooling water, will be found to be satisfactory. The hydrofluoric acid phase is withdrawn from settler 15 through pipe 16 and may be returned through pipe 17 to reactor 13. A desired portion of the used hydrofluoric acid catalyst, generally somewhere within the range of about 1 to about 10 per cent by volume, may be passed from pipe 16 through pipe 30 to the purification steps to be described. Any portion may be discharged or dumped from the system in case of an emergency through pipe 18.

A liquid hydrocarbon phase is withdrawn from settler 15 through pipe 20 and passed to separating means 21, which will comprise a series of fractional distillation columns together with associated equipment, equipment for purifying various hydrocarbon streams such as a bauxite contactor for removing small amounts of organic fluorine compounds from the alkylate, and the like. A light alkylate fraction is recovered as a product of the process through pipe 22 and a heavy alkylate fraction is recovered through pipe 23. Unreacted isobutane is recycled through pipe 24 to pipe 10 in an amount sufficient to bring the isobutane to olefin ratio in the feed to the reactor up to a desired extent. Undesired low-boiling material, such as normal butane and other material boiling below isobutane, can be removed through pipe 25. Since the hydrocarbon phase passed through pipe 20 will contain a small amount of dissolved hydrogen fluoride, a stream comprising hydrogen fluoride will generally be removed in separating means 21 and can be returned through pipe 26 which leads to pipe 17.

The portion of the used hydrofluoric acid catalyst passed through pipe 30 to purification equipment may be heated in heater 31 to a temperature between about 200 and about 350° F. and introduced into flash chamber 32 at a pressure between atmospheric and about 50 to about 75 pounds gage. The hydrogen fluoride is substantially completely vaporized and in the higher temperature range substantially all of the accompanying water and other material of similar vapor pressure will also be vaporized. The resulting vapors pass through pipe 33 to distillation column 34 and may be cooled somewhat, if desired, by cooling means not shown. High-boiling organic material collects as a liquid in the bottom of flash chamber 32. If desired, this material may be heated to a still higher temperature, such as about 400 to about 500° F., by means of a heating coil 35 whereby fluorine-containing compounds can be decomposed forming free hydrogen fluoride. Physical separation between vapors and liquid in flash chamber 32 may be aided by suitable baffles, not shown, within the chamber. A heavy oil fraction may be discharged from the bottom through pipe 36. Fractional distillation column 34 is operated as a conventional distillation column with suitable means for contacting reflux liquid and ascending vapors, such as bubble trays or the like. Reflux may be obtained by cooling coil 37 and distillation may be aided by heating coil 38. Purified hydrogen fluoride is withdrawn as an overhead product through pipe 40. This fraction will be substantially anhydrous, but may be accompanied by a small amount of hydrocarbon material, up to as much as about 10 to about 20 per cent. This fraction is passed by pipe 40 to pipe 26 and pipe 17, thereby being returned to the alkylation zone.

At least a portion of the liquid material collecting in the bottom of fractional distillation column 34 may be returned to flash chamber 32 through a pipe 41. In some instances a mixture of oil and water will tend to collect, and pipe 41 may be so arranged as to take more of the oil fraction than of the water fraction. This return may be effected by gravity if column 34 is at a suitable elevation above flash chamber 32. A fraction comprising aqueous hydrogen fluoride, and in some instances comprising also some organic material, is withdrawn from the bottom of column 34 through pipe 42 and passed to a stripping column 43, either through pipe 44 to an intermediate portion of the column or through pipe 45 to the top of the column as a combined feed and reflux stream. Stripping column 43 is equipped with bubble trays or the like so as to facilitate efficient fractionation and a heating coil 46 may be used to supply heat to the kettle. An olefin-containing fraction is introduced near the bottom of stripping column 43 through pipe 47. When the conversion which is carried out in reactor 13 is one of alkylation wherein a low-boiling olefin is the alkylating reactant, such as is the case in the specific application of my invention under discussion, this olefin-containing fraction may be a portion of the olefin-containing material charged through pipe 11. In stripping column 43 hydrogen fluoride is removed from the water which accompanies it in the charge. This is effected, at least in part, by reaction with olefin hydrocarbons to produce alkyl fluorides, and perhaps also in part by the action of the hydrocarbon material present which will tend to form low-boiling azeotropes with free hydrogen fluoride. The resulting vapors pass overhead through pipe 50, are cooled and condensed in condenser 51, and pass to an accumulator and settler 52. In many instances some water will also pass overhead and will separate out as a separate liquid in accumulator 52. This water can be discharged from the system through pipe 53. A liquid organic material also separates in accumulator 52 which comprises alkyl fluorides, any unreacted olefin, and accompanying unreacted paraffin. This material may be removed and passed in part to the top of stripping column 43 through pipe 54 and in part through pipe 55 back to the conversion zone. Although this latter fraction may contain a small amount of dissolved water, the amount of water so returned to the conversion zone will be minor in comparison to the amount of water in the used catalyst passed through pipe 30 to the purification so that further water removal will generally be unnecessary. However, if desired, this stream may be further dried by equipment not shown, such as with calcium chloride or the like. Since sulfuric acid may tend to react both with the olefins present and with the alkyl fluorides, and since an absorbent, such as alumina, will tend to take up fluorine compounds, it is well not to use drying agents of these types. A high-boiling liquid fraction, comprising water and also often containing some oils, is removed from the bottom of stripping column 43 through pipe 56 and may be discharged from the system.

A somewhat different arrangement of steps for purifying the used hydrofluoric acid catalyst is shown in Figure 2 which includes only equipment directly pertinent to the purification and in which equipment similar to that used in Figure 1 is identified by similar numerals. In one modification of the embodiment shown in Figure 2 flash chamber 32 is operated at a somewhat lower temperature than was used in connection with the embodiment discussed for Figure 1. As a result of this lower temperature the fraction withdrawn through pipe 36 from the bottom of chamber 32 will contain water which, of course, will be saturated with hydrogen fluoride at the prevailing conditions, as well as heavy organic material. At least a portion of this fraction is passed from pipe 36 to pipe 42 and to stripping column 43 which will be operated in the general manner discussed in connection with Figure 1. For such an operation flash chamber 32 will be operated in the lower part of the temperature range, such as at a temperature between about 200 and about 275° F. A partial removal of hydrogen fluoride from this water may be effected by passing an olefin-containing fraction from pipe 47 to pipe 60 to the liquid contained in the bottom of chamber 32. However, since the high temperatures which will be employed at this point, even in this low temperature modification, will tend to decompose alkyl fluoride to substantial extents, such a modification will generally not effect complete removal of hydrogen fluoride from the water which may collect in this portion of the system. With such a modification all of the liquid collecting in the bottom of distillation column 34 may be returned to flash chamber 32 through pipe 41 so that all of the material charged through pipe 30 will be removed either through pipe 40 as a low-boiling fraction or through pipe 36 as a high-boiling fraction. In some instances, however, excessive corrosion will be experienced at various portions of this system unless these portions are constructed of corrosion-resistant materials. To overcome this, fractionating column 34 may be so operated that an aqueous fraction containing a high concentration of hydrogen fluoride is removed from the bottom of column 34 through pipe 62 and passed to a second distillation column 63. This distillation column may be quite small as compared with flash chamber 32 and column 34, and may be constructed of corrosion-resistant material such as copper, a high nickel alloy, or of silver Corrosive aqueous hydrogen fluoride is removed as a kettle product through pipe 64 and may be passed to pipe 42 and stripping column 43 for treatment as hereinbefore discussed. Discharge of such a fraction from the system may be effected through pipe 65. A hydrogen fluoride fraction containing only a small amount of water will be removed as a low-boiling product through pipe 66 and returned to an intermediate portion of distillation column 34.

In either modification, illustrated by Figure 1 or Figure 2, stripping column 43 may be operated with a kettle temperature between about 200 and about 400° F. and a reflux temperature between about 120 and about 250° F. The amount of olefin added should be at least molecularly equivalent to the hydrogen fluoride content of the mixture subjected to distillation.

It will be readily appreciated by one skilled in the art that the drawing is schematic only and that numerous pieces of additional equipment, such as alkylation contactors, means for removing the heat from such contactors, fractional distillation columns and associated equipment for separating means 21, and various pumps, flow control valves, heating and cooling means, and the like, have not been shown in detail. However, a sufficient amount of the essential equipment and a discussion of the general flow, material compositions, and operating conditions have been given herein to act as a complete guide to one skilled in the art to enable him to adapt the invention and install equipment for any specific modification thereof. A somewhat similar material flow will be used when aromatic hydrocarbons are alkylated or when either paraffin or aromatic hydrocarbons are alkylated with other alkylating reactants such as alkyl halides, alcohols, and the like. The application of my invention to the effluents of an isomerization process in which hydrofluoric acid is used as a catalyst will not be materially different from that which has been discussed in connection with alkylation.

As an example of the operation of my invention, an isoparaffin-olefin mixture having a composition similar to that given in column D of the table presented hereinbefore is charged to an alkylation plant wherein concentrated hydrofluoric acid is used as a catalyst. A sufficient amount of unreacted isobutane is recycled to make the liquid volume ratio of isobutane to olefin in the net feed about 4.6:1; the reaction temperature is maintained at about 84° F., the pressure at about 100 pounds gage, the ratio of liquid hydrocarbon to hydrofluoric acid is about 1:1, and the reaction time is about 10 minutes. The reaction effluents are passed to an acid settler, from which a liquid hydrocarbon phase is passed to separating equipment. The alkylate boiling in the aviation gasoline range, having an end point of 353° F., is 96.5 per cent of the total alkylate and has an octane number of 89. The hydrofluoric acid from the settler has the following composition:

| Component | Wt., % |
| --- | --- |
| Hydrogen Fluoride | 88.8 |
| Water | 0.6 |
| Acid Soluble Oils | 4.2 |
| Light hydrocarbons | 6.4 |
|  | 100.0 |

Of this hydrofluoric acid from the settler about 95% is passed back to the alkylation reactor, together with purified hydrofluoric acid and sufficient fresh hydrofluoric acid to make up for mechanical losses, and about 5% is passed to purification. In the purification this used hydrofluoric acid is first heated to a temperature of about 250° F. and passed into a vaporizing zone at a pressure of about 35 pounds gage, wherein most of the hydrogen fluoride is vaporized. The liquid in the bottom of this vaporizing zone is heated to about 300° F., whereby some decomposition of organic fluorine compounds to form free hydrogen fluoride is effected. The vapors from this zone are cooled and introduced into a distillation column operated at a top temperature of about 230° F. and a bottom temperature of about 250° F. Substantially anhydrous hydrogen fluoride, accompanied by about 5% of low-boiling hydrocarbon material, is withdrawn from this distillation and returned to the alkylation reactor. The bottom product from this distillation is allowed to run back, by gravity, into the vaporization zone. A liquid comprising water, dissolved hydrogen fluoride, and heavy organic matter, commonly known as "acid soluble oils" is withdrawn from the bottom of the vaporization zone, is cooled somewhat, and passed, as a combined feed and partial reflux stream, to the top of another fractional distillation zone at a temperature of about 250° F. The relative amounts of water and hydrogen fluoride in this liquid are, by weight, about 3:2, i. e. approximately the composition of a maximum-boiling azeotropic mixture, and this comprises about 15% of the total liquid. To this last distillation zone is also passed a portion of the olefin-containing feed charged to the alkylation plant in an amount such that the olefins are about twice the stoichiometrical equivalent of the hydrogen fluoride. This olefin-containing stream is introduced as a vapor at the bottom of the distillation column at a temperature of about 300° F. An overhead product comprising water, hydrocarbons, and fluorine compounds, including primarily alkyl fluorides, is cooled and condensed and passed to an accumulator. Liquid water separates out in the accumulator and is withdrawn from the system. A portion of the non-aqueous liquid layer is returned to the top of the distillation column as reflux and the remainder is passed to the alkylation plant. Heat is supplied to the bottom of the distillation column to maintain a temperature of about 300° F., and heavy organic oils are withdrawn as a kettle product.

I claim:

1. In a continuous process for the alkylation of a low-boiling isoparaffin by reaction with a low-boiling olefin in the presence of a hydrofluoric acid catalyst, the improvement which comprises passing a low-boiling isoparaffin and a low-boiling olefin and a hydrofluoric acid alkylation catalyst to an alkylation zone, maintaining contents of said zone under alkylation reaction conditions, passing effluents of said alkylation zone to separating means and therein separating a liquid hydrocarbon phase from a liquid hydrofluoric acid phase, passing at least a portion of said liquid hydrofluoric acid phase to a first distillation and separating therefrom as a high-boiling fraction heavy oils contained therein, passing a resulting low-boiling fraction to a second fractional distillation and separating same into a low-boiling fraction comprising purified hydrofluoric acid and a high-boiling fraction comprising aqueous hydrogen fluoride, passing said low-boiling fraction to said alkylation zone, passing said high-boiling fraction to a third distillation, passing also to said third distillation a portion of the olefin-containing material charged to said alkylation zone, removing from said third distillation zone a low-boiling substantially water-free fraction comprising an alkyl fluoride formed by reaction in said third distillation between hydrogen fluoride and said olefin-containing material, and passing said fraction to said alkylation zone.

2. In a process for the alkylation of a low-boiling isoparaffin by reaction with a low-boiling olefin in the presence of a hydrofluoric acid catalyst, the improvement which comprises passing effluents of such an alkylation to separating means and therein separating liquid hydrofluoric acid from hydrocarbons, passing at least a portion of said liquid hydrofluoric acid to a first distillation and separating therefrom as a high-boiling fraction heavy oils contained therein, passing a resulting low-boiling fraction to a second fractional distillation and separating same into a low-boiling fraction comprising purified hydrogen fluoride and a high-boiling fraction comprising aqueous hydrogen fluoride, passing said low-boiling fraction to the aforesaid alkylation, passing said high-boiling fraction to a third distillation and distilling same in the presence of an added low-boiling olefin hydrocarbon to form a low-boiling alkyl fluoride-containing fraction, and recovering such a low-boiling fraction and passing same to said alkylation.

3. In a process for the conversion of hydrocarbons in the presence of a hydrofluoric acid catalyst, the improvement which comprises passing effluents of such a conversion to separating means and therein separating liquid hydrofluoric acid from hydrocarbons, passing at least a portion of said liquid hydrofluoric acid to a distillation means and separating therefrom as a low-boiling fraction purified hydrogen fluoride and returning same to said conversion, separating also therefrom as a high-boiling fraction aqueous hydrogen fluoride together with heavy organic material, passing said high-boiling fraction to a fractional distillation and distilling same in the presence of an added low-boiling olefin hydrocarbon to form a low-boiling fluorine-containing fraction and a high-boiling fraction containing undesired organic impurities, removing water from said low-boiling fluorine-containing fraction and passing the resulting water-free fraction to said conversion.

4. In a continuous process for the alkylation of a low-boiling isoparaffin by reaction with a low-boiling olefin in the presence of a hydrofluoric acid catalyst, the improvement which comprises passing a low-boiling isoparaffin and a low-boiling olefin and a hydrofluoric acid alkylation catalyst to an alkylation zone, maintaining contents of said zone under alkylation reaction conditions, passing effluents of said alkylation zone to separating means and therein separating a liquid hydrocarbon phase from a liquid hydrofluoric acid phase, passing at least a portion of said liquid hydrofluoric acid to a distillation means and separating therefrom as a low-boiling fraction purified hydrogen fluoride and returning same to said alkylation zone, separating also therefrom a high-boiling fraction comprising aqueous hydrogen fluoride, passing said high-boiling fraction to a fractional distillation and distilling same in the presence of an added low-boiling olefin hydrocarbon, and recovering as a low-boiling product of said distillation a substantially water-free fluorine-containing fraction and passing same to said alkylation zone.

5. In a process for the alkylation of isobutane with butylene in the presence of substantially anhydrous hydrogen fluoride comprising the steps of passing isobutane and butylene in the molecular ratio of about 3:1 to about 10:1 of isobutane to butylene to a reaction zone, introducing hydrogen fluoride in the ratio of about 1:1 to about 10:1 of hydrocarbons to hydrogen fluoride into said reaction zone to admix with said isobutane and said butylene, maintaining the resulting mixture under alkylation reaction conditions, passing hydrocarbon conversion effluents containing heavy acid-soluble oils and hydrogen fluoride from said reaction zone to a separating means and therein separating a liquid hydrocarbon phase from a liquid hydrogen fluoride phase containing said acid-soluble oils, passing at least a portion of said liquid hydrogen fluoride phase to a fractional distillation and separating therefrom a high-boiling fraction containing said acid-soluble oils, and passing a resulting low-boiling fraction to a second fractional distillation and separating same into a low-boiling fraction comprising purified hydrogen fluoride and a high-boiling fraction comprising aqueous hydrogen fluoride, the improvement which comprises passing said aqueous hydrogen fluoride into the upper portion of a fractional distillation column, maintaining a temperature in the lower portion of said column between about 200 and about 400° F. and a temperature in the upper portion of said column between about 120 and about 250° F., introducing a low-boiling olefin having not more than six carbon atoms per molecule in an amount at least molecularly equivalent to the hydrogen fluoride content of said aqueous hydrogen fluoride, vaporizing said olefin in said column, removing a vaporous low-boiling product comprising unreacted olefin and alkyl fluoride from the upper portion of said column, removing a liquid high-boiling product comprising substantially hydrogen fluoride-free water from the lower portion of said column, condensing said low-boiling product, and recycling one portion of said condensed product to said distillation column as a reflux therefor and another portion to said reaction zone of said process.

6. In the process for the alkylation of a low-boiling isoparaffin by reaction with a low-boiling olefin in the presence of a hydrofluoric acid catalyst, the improvement which comprises passing an effluent of such an alkylation to a separating means and therein separating liquid hydrofluoric acid from hydrocarbons, passing at least a portion of said liquid hydrofluoric acid to a first distillation zone and distilling same in the presence of an added low-boiling olefin hydrocarbon, withdrawing a low-boiling fraction from said first distillation and passing same to a second fractional distillation, withdrawing a low-boiling fraction from said second distillation and recycling same to said alkylation reaction, withdrawing a high-boiling fraction from said second distillation and passing same to said first distillation, removing a high-boiling fraction comprising aqueous hydrogen fluoride from said first distillation, passing said high-boiling fraction from said first distillation to a third fractional distillation and distilling same in the presence of an added low-boiling olefin hydrocarbon, and recovering a low-boiling fraction from said third fractional distillation and recycling same to said alkylation reaction.

7. In a process for the conversion of hydrocarbons in the presence of a hydrofluoric acid catalyst, the improvement which comprises passing effluents of such a conversion to separating means and therein separating liquid hydrofluoric acid from hydrocarbons, passing at least a portion of said liquid hydrofluoric acid to a distillation means and separating therefrom as a low-boiling fraction purified hydrogen fluoride and returning same to said conversion, separating also therefrom as a high-boiling fraction aqueous hydrogen fluoride, passing said high-boiling fraction to a distillation and distilling same in the presence of a low-boiling olefin hydrocarbon to form a low-boiling fluorine-containing fraction, and recovering such a low-boiling fraction and passing same to said conversion.

8. In a process for the conversion of hydrocarbons in the presence of a hydrofluoric acid actalyst, the improvement which comprises passing an effluent of such a conversion to a separating means and therein separating liquid hydrofluoric acid from hydrocarbons, passing at least a portion of said liquid hydrofluoric acid to a distillation means and separating therefrom a low-boiling fraction comprising purified hydrogen fluoride and returning same to said conversion, separating also therefrom a high-boiling fraction comprising aqueous hydrogen fluoride, passing said high-boiling fraction to a distillation and distilling same in the presence of an olefin hydrocarbon having not more than six carbon atoms per molecule to form a low-boiling fluorine-containing fraction, and recovering such a low-boiling fraction and passing same to said conversion.

9. In a process for the alkylation of isobutane with a low-boiling olefin in the presence of a hydrofluoric acid catalyst, the improvement which comprises passing an effluent of such an alkylation to a separating means and therein separating liquid hydrofluoric acid from hydrocarbons, passing at least a portion of said liquid hydrofluoric acid to a distillation means and separating therefrom a low-boiling fraction comprising purified hydrogen fluoride and returning same to said alkylation, separating also therefrom a high-boiling fraction comprising aqueous hydrogen fluoride, passing said high-boiling fraction to a distillation and distilling same in the presence of an olefin hydrocarbon having not more than six carbon atoms per molecule to form a low-boiling fluorine-containing fraction, and recovering such a low-boiling fraction and passing same to said alkylation.

ANCEL B. LEONARD.

REFERENCES CITED

The following references are of record in the file of this patent:

UNITED STATES PATENTS

| Number | Name | Date |
|---|---|---|
| 2,307,799 | Linn | Jan. 12, 1943 |
| 2,342,677 | Linn | Feb. 29, 1944 |

FOREIGN PATENTS

| Number | Country | Date |
|---|---|---|
| 117,359 | Australian | Aug. 5, 1943 |